Patented Apr. 30, 1935

1,999,380

UNITED STATES PATENT OFFICE 1,999,380

SYNTHETIC RESIN AND PROCESS OF PRODUCING IT

John Morris Weiss, New York, N. Y., assignor to Weiss and Downs, Inc., New York, N. Y., a corporation of New York No Drawing. Application November 17, 1933, Serial No. 698,501

9 Claims. (Cl. 260—2)

This invention relates to a type of synthetic resin and the process of producing it. The process comprises treating a monosaccharide such as dextrose with a dibasic organic acid or an anhydride of a dibasic acid such as phthalic anhydride or maleic acid anhydride. The character of the products varies, dependent on the particular raw materials selected and the manner in which the condensation is carried on.

Example I.—One hundred parts by weight of maleic acid anhydride are melted and heated with agitation at 110° C. Then one hundred and eighty parts by weight of corn sugar (dextrose) are gradually added with continuing agitation. Some cooling takes place from the addition of the corn sugar and when the temperature reaches 110° C. again a homogeneous liquid mass results. The temperature is gradually raised and the mass froths and gives off water vapor. The mixture darkens somewhat and thickens as the heating progresses. After the temperature reaches 150° C., the product is drawn off and allowed to cool.

The brown solid obtained is a hard cake of a specific gravity of about 1.480 at 25° C. which can readily be reduced to a powder. It is readily soluble in water but relatively insoluble in cold 95% ethyl alcohol. Other solubilities noted are

| | |
|---|---|
| Benzol | practically insoluble |
| Carbon tetrachloride | insoluble |
| Ethylene dichloride | insoluble |
| Isopropyl alcohol | soluble |
| Dichlorethyl ether | insoluble |
| Dioxan | insoluble |

When the product is treated with methanol, it appears slightly soluble in the cold and partly soluble and partly dispersed on boiling. The boiled solution after filtering is clear but after cooling and standing shows a further separation of solids. Even after prolonged standing at room temperature, a substantial portion of the product remains in solution.

On taking the resin formed as above described and heating at 150° C. for four hours, it shows a loss in weight of less than 5% and after the heating, is insoluble in both water and cold methanol. In hot methanol and with prolonged heating, a partial solution is noted. The heated product is somewhat rubbery when hot and hard and tough when cold.

Example II.—One hundred and fifty parts by weight of phthalic acid anhydride are heated to 150° C. and one hundred and eighty parts of dextrose (corn sugar) added gradually, stirring and maintaining the temperature at 150° C. After all the dextrose is added, the temperature is gradually raised over about one hour to 170° C. During the process, water vapor is evolved and the mass thickens and becomes somewhat darker in color. It is poured out into a mold and allowed to solidify, forming a hard brittle resin with a specific gravity of about 1.49 at 25° C.

The product is practically insoluble in cold water, partly soluble in boiling water and is broken up on continued boiling to a part solution and a part suspension. It is readily soluble in methanol, ethyl alcohol, isopropyl alcohol, and dioxan, and insoluble or only slightly soluble in benzol, carbon tetrachloride and ethylene dichloride. If the methanol solution is diluted with water, a very fine precipitate is obtained.

A portion of the product baked at 165° C. for 1½ hours more, darkened slightly in color but its solubility in the various solvents is the same as in the case of the unbaked product except that its solubility in hot water is decreased.

On evaporating the methanol solution of this heat treated product, clear transparent films of the resin are obtained.

Example III.—A mixture of 50 parts by weight of maleic acid anhydride and 75 parts of phthalic anhydride are heated and stirred. At 100° C. when the maleic anhydride is melted and the phthalic anhydride only partly melted, 180 parts of dextrose are added. The mass then works up like a dough and gradually melts as the temperature is raised to 150° C. The mixture is completely homogeneous and after stirring for 20 minutes at 150° C. is poured out and allowed to solidify.

This product has a specific gravity at 25° C. of about 1.36 and is readily soluble in water, insoluble in benzol, carbon tetrachloride and ethylene dichloride, and only partly soluble in ethyl alcohol and dioxan. With methanol it goes into solution with difficulty after considerable heating with a slight amount of insoluble residue.

A portion of the product was baked at 120°–135° C. for five hours. The loss in weight was negligible but the product became rather porous and lost its resinoid appearance. It appeared opaque due apparently to the inclusion of numerous minute bubbles. Its solubilities were the same as with the unbaked product except that it was now readily soluble in methanol without continued boiling.

*Example IV.*—One hundred and eighteen parts by weight of succinic acid and one hundred and eighty parts of cerulose are mixed and gradually heated to 175° C. forming a homogeneous mass. The temperature is maintained around 175° C. for a short time and then removed from the reaction vessels and allowed to cool and solidify. A dark, hard resinous material results. The product is readily soluble in water and methanol, slowly soluble in 95% ethyl alcohol and insoluble in benzol, carbon tetrachloride, dioxan and ethylene dichloride. It is brittle and is readily powdered.

The process has been described specifically in connection with dextrose but other hexoses (a sugar containing 6 carbon atoms) such as laevulose, mannose, galactose and various aldo and keto hexoses may be employed as one raw material. Similarly other anhydrides of dibasic acids can be employed as the other raw material for the synthesis of the resin. In some cases the acid itself rather than the anhydride can be used as, for example, maleic acid or acetylene dicarboxylic acid. In general the acid and anhydride belong to the class which have at least two carboxyl groups attached to adjacent carbon atoms. Anhydrides which have been found quite suitable have the carboxyl groups attached to adjacent carbon atoms which atoms are joined by a double or triple linkage. Thus, both maleic and phthalic anhydride contain the group

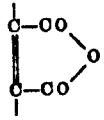

Mixed anhydrides, or mixed hexoses, may be used and the claims are intended to cover mixtures under the term "hexose" or "anhydride".

The time and temperature of the mixing operation can be varied over rather wide limits, it however being necessary to keep the temperature below the point at which undesirable carbonization takes place.

The resins have thermoplastic properties and may be used as binders in the water soluble state and afterward the product may be rendered insoluble in water by suitable heat treatment. The alcohol soluble varieties may be used as lacquer constituents and the alcohol solutions form a convenient way of using the resins as impregnating compounds.

Having thus described my invention, I claim:

1. The process of producing a water soluble resinous product which comprises mixing and heating a hexose with an anhydride of a dicarboxylic organic acid at a temperature not exceeding 170° C.

2. The process of producing a water soluble resinous product which comprises mixing and heating a hexose with an organic acid anhydride containing the group

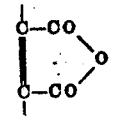

at a temperature not exceeding 170° C.

3. The process of producing a water soluble resinous product which comprises mixing and heating dextrose and maleic acid anhydride at a temperature not exceeding 170° C.

4. As a new article of manufacture, a water soluble resinous product made by mixing and heating dextrose with maleic acid anhydride at a temperature not exceeding 170° C.

5. As a new article of manufacture, a water soluble resinous product made by mixing and heating dextrose with phthalic acid anhydride at a temperature not exceeding 170° C.

6. The process of producing a resinous product which comprises mixing and heating a hexose with an anhydride of a dicarboxylic organic acid at a temperature below 175° C.

7. The process of producing a resinous product which comprises mixing and heating dextrose with an organic acid anhydride containing the group

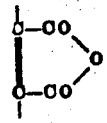

at a temperature below 175° C.

8. The process of producing a resinous product which comprises mixing and heating dextrose with phthalic anhydride at a temperature below 175° C.

9. The process of producing a resinous product which comprises mixing and heating dextrose with maleic acid anhydride at a temperature below 175° C.

JOHN MORRIS WEISS.